(12) United States Patent
Abrams et al.

(10) Patent No.: US 10,387,003 B2
(45) Date of Patent: *Aug. 20, 2019

(54) USER INTERFACE WITH RUNTIME SELECTION OF VIEWS

(71) Applicant: CA, Inc., Islandia, NY (US)

(72) Inventors: Howard A. Abrams, San Mateo, CA (US); Stanislav Mitranic, Calgary (CA)

(73) Assignee: CA, Inc., New York, NY (US)

( * ) Notice: Subject to any disclaimer, the term of this patent is extended or adjusted under 35 U.S.C. 154(b) by 336 days.

This patent is subject to a terminal disclaimer.

(21) Appl. No.: 14/672,821

(22) Filed: Mar. 30, 2015

(65) Prior Publication Data
US 2015/0205471 A1 Jul. 23, 2015

Related U.S. Application Data

(62) Division of application No. 13/617,066, filed on Sep. 14, 2012, now Pat. No. 9,348,490.

(51) Int. Cl.
*G06F 3/0484* (2013.01)
*G06F 16/957* (2019.01)
(Continued)

(52) U.S. Cl.
CPC ...... *G06F 3/0484* (2013.01); *G06F 16/24578* (2019.01); *G06F 16/9577* (2019.01); *H04L 67/10* (2013.01); *H04L 67/42* (2013.01)

(58) Field of Classification Search
CPC .............. G06F 3/0484; G06F 17/3053; G06F 17/30905; H04L 67/10; H04L 67/42
See application file for complete search history.

(56) References Cited

U.S. PATENT DOCUMENTS 6,195,707 B1 * 2/2001 Minh ................ G06F 17/30887
707/E17.115
6,314,439 B1 * 11/2001 Bates ................ G06F 17/30884
707/E17.114

(Continued)

OTHER PUBLICATIONS

Notice of Allowance, U.S. Appl. No. 13/617,066, dated Sep. 23, 2015, United States Patent and Trademark Office, Alexandria, VA.

(Continued)

*Primary Examiner* — Jung-Mu T Chuang
(74) *Attorney, Agent, or Firm* — Meyertons, Hood, Kivlin, Kowert & Goetzel, P.C.

(57) ABSTRACT

A method, system and computer program product for providing a configurable user interface comprises receiving, by a server computer, a request for information to be rendered in a user interface; and in response to the request, sending, by the server computer, the information to be rendered and an identifier related to one of a plurality of user interface components. Also, in response to the request, the server computer sends a registry of the plurality of user interface components, wherein the registry comprises a respective entry for each of the plurality of user interface components. More particularly, the respective entry for a particular one of the plurality of user interface components comprises: a) a location of a configuration associated with the particular one user interface component; and b) a plurality of attributes and corresponding attribute values associated with the particular one user interface component.

12 Claims, 5 Drawing Sheets

(51) Int. Cl.
  *G06F 16/2457* (2019.01)
  *H04L 29/06* (2006.01)
  *H04L 29/08* (2006.01)

(56) References Cited

U.S. PATENT DOCUMENTS

| | | | |
|---|---|---|---|
| 6,404,445 B1 | 6/2002 | Galea et al. | |
| 6,546,397 B1* | 4/2003 | Rempell | G06F 8/20 |
| 6,804,816 B1 | 10/2004 | Liu et al. | |
| 6,865,524 B1* | 3/2005 | Shah | G06F 17/50 |
| | | | 703/13 |
| 6,950,850 B1 | 9/2005 | Leff et al. | |
| 6,990,654 B2 | 1/2006 | Carroll | |
| 6,996,800 B2* | 2/2006 | Lucassen | G06F 8/38 |
| | | | 717/104 |
| 7,089,530 B1 | 8/2006 | Dardinski et al. | |
| 7,103,853 B1 | 9/2006 | Patil | |
| 7,106,337 B2 | 9/2006 | Lu | |
| 7,162,697 B2 | 1/2007 | Markel | |
| 7,210,094 B2 | 4/2007 | Dovin et al. | |
| 7,216,298 B1 | 5/2007 | Ballard et al. | |
| 7,225,424 B2* | 5/2007 | Cherdron | G06F 8/38 |
| | | | 717/104 |
| 7,263,663 B2 | 8/2007 | Ballard et al. | |
| 7,272,815 B1 | 9/2007 | Eldridge et al. | |
| 7,308,649 B2* | 12/2007 | Ehrich | G06F 16/958 |
| | | | 715/235 |
| 7,409,692 B2* | 8/2008 | Ittel | G06F 8/36 |
| | | | 717/106 |
| 7,603,657 B2 | 10/2009 | Gassner et al. | |
| 7,636,852 B1 | 12/2009 | Balasubramanian et al. | |
| 7,681,138 B2 | 3/2010 | Grasser et al. | |
| 7,752,637 B2 | 7/2010 | Gunduc et al. | |
| 7,788,214 B2 | 8/2010 | Fernandez et al. | |
| 7,801,949 B2 | 9/2010 | Sundaresan | |
| 8,108,404 B2 | 1/2012 | Sylthe et al. | |
| 8,166,455 B2 | 4/2012 | Voss | |
| 8,185,562 B2* | 5/2012 | Koch | G06Q 10/10 |
| | | | 707/706 |
| 8,185,917 B2* | 5/2012 | Grechanik | G06F 11/3692 |
| | | | 714/38.1 |
| 8,266,202 B1* | 9/2012 | Colton | G06F 8/30 |
| | | | 709/202 |
| 8,271,703 B2 | 9/2012 | Wang et al. | |
| 8,429,630 B2 | 4/2013 | Nickolov et al. | |
| 8,516,442 B2* | 8/2013 | Grechanik | G06F 8/38 |
| | | | 715/229 |
| 8,533,661 B2* | 9/2013 | Nucci | G06F 8/10 |
| | | | 717/105 |
| 8,589,446 B2* | 11/2013 | Peterson | G06F 9/4443 |
| | | | 707/797 |
| 8,612,947 B2 | 12/2013 | LeRoux et al. | |
| 8,645,939 B2* | 2/2014 | Felts | G06F 8/60 |
| | | | 709/223 |
| 8,704,775 B2 | 4/2014 | Cantrell | |
| 8,713,520 B2 | 4/2014 | Bank et al. | |
| 8,780,130 B2* | 7/2014 | Morris | G06F 3/0484 |
| | | | 345/581 |
| 8,793,584 B2 | 7/2014 | Chen et al. | |
| 8,806,329 B2* | 8/2014 | Steelberg | G06Q 30/0242 |
| | | | 715/234 |
| 8,839,132 B2* | 9/2014 | Reichert | G06Q 10/087 |
| | | | 345/419 |
| 8,843,827 B2 | 9/2014 | Koo et al. | |
| 8,935,147 B2* | 1/2015 | Stern | G06Q 10/00 |
| | | | 704/2 |
| 8,996,987 B2* | 3/2015 | Rivera | G06F 3/0481 |
| | | | 345/548 |
| 9,009,110 B2* | 4/2015 | Brunswig | G06F 8/30 |
| | | | 707/626 |
| 9,143,378 B2* | 9/2015 | Behl | H04L 29/00 |
| 9,208,253 B2* | 12/2015 | Zoheir | G06F 17/30905 |
| 9,294,538 B1* | 3/2016 | Rana | G06F 9/45529 |
| 9,423,954 B2* | 8/2016 | Morris | G06F 3/0484 |
| 9,575,949 B2* | 2/2017 | Delancy, Jr. | G06F 17/243 |
| 2002/0085020 A1 | 7/2002 | Carroll | |
| 2002/0088008 A1 | 7/2002 | Markel | |
| 2002/0101448 A1 | 8/2002 | Sanderson | |
| 2002/0124076 A1* | 9/2002 | Lindstrom-Tamer | G06F 16/9577 |
| | | | 709/224 |
| 2002/0156922 A1 | 10/2002 | Chan et al. | |
| 2003/0046401 A1* | 3/2003 | Abbott | G06F 9/4443 |
| | | | 709/228 |
| 2003/0058277 A1* | 3/2003 | Bowman-Amuah | G06F 17/30607 |
| | | | 715/765 |
| 2003/0195923 A1 | 10/2003 | Bloch et al. | |
| 2004/0064802 A1* | 4/2004 | Cherdron | G06F 8/38 |
| | | | 717/100 |
| 2004/0261047 A1* | 12/2004 | Ashida | G06F 17/243 |
| | | | 716/104 |
| 2005/0071749 A1* | 3/2005 | Goerke | G06F 8/38 |
| | | | 715/205 |
| 2005/0071758 A1* | 3/2005 | Ehrich | G06F 9/451 |
| | | | 715/234 |
| 2005/0071850 A1* | 3/2005 | Ittel | G06F 8/36 |
| | | | 719/320 |
| 2005/0256852 A1 | 11/2005 | McNall et al. | |
| 2005/0273762 A1 | 12/2005 | Lesh | |
| 2006/0053411 A1 | 3/2006 | Takamiya | |
| 2006/0143220 A1* | 6/2006 | Spencer, Jr. | G06F 8/20 |
| 2006/0173808 A1 | 8/2006 | Peterson et al. | |
| 2006/0206866 A1 | 9/2006 | Eldrige et al. | |
| 2006/0224946 A1* | 10/2006 | Barrett | G06F 17/246 |
| | | | 715/210 |
| 2006/0248166 A1 | 11/2006 | Milosevic et al. | |
| 2007/0180066 A1* | 8/2007 | Sherwood | G06F 16/954 |
| | | | 709/220 |
| 2007/0180432 A1* | 8/2007 | Gassner | G06F 9/4451 |
| | | | 717/136 |
| 2007/0239291 A1* | 10/2007 | Wayland | G05B 23/0272 |
| | | | 700/83 |
| 2007/0271501 A1* | 11/2007 | Vasilik | G06F 16/95 |
| | | | 715/234 |
| 2007/0277109 A1* | 11/2007 | Chen | G06F 8/20 |
| | | | 715/733 |
| 2008/0120594 A1 | 5/2008 | Lucas et al. | |
| 2008/0244560 A1* | 10/2008 | Neagu | G06F 8/70 |
| | | | 717/174 |
| 2008/0288459 A1* | 11/2008 | Kim | G06F 17/30905 |
| 2009/0063178 A1* | 3/2009 | Pousti | G06Q 50/01 |
| | | | 705/319 |
| 2009/0106366 A1 | 4/2009 | Virtanen et al. | |
| 2009/0132915 A1* | 5/2009 | McCraw | G06F 9/4443 |
| | | | 715/700 |
| 2009/0132954 A1* | 5/2009 | Cupitt | G05B 19/4063 |
| | | | 715/781 |
| 2009/0144726 A1* | 6/2009 | Felts | G06F 8/60 |
| | | | 717/174 |
| 2009/0171655 A1* | 7/2009 | Stern | G06Q 10/00 |
| | | | 704/8 |
| 2009/0172569 A1 | 7/2009 | Arthursson et al. | |
| 2009/0210781 A1* | 8/2009 | Hagerott | G06F 9/451 |
| | | | 715/234 |
| 2009/0217250 A1* | 8/2009 | Grechanik | G06F 8/36 |
| | | | 717/136 |
| 2009/0217302 A1* | 8/2009 | Grechanik | G06F 8/70 |
| | | | 719/320 |
| 2009/0217309 A1* | 8/2009 | Grechanik | G06F 8/38 |
| | | | 719/328 |
| 2009/0265686 A1 | 10/2009 | Lucas et al. | |
| 2009/0288098 A1* | 11/2009 | Abd-El-Malek | G06F 9/545 |
| | | | 719/312 |
| 2009/0320050 A1* | 12/2009 | Pousti | G06Q 10/10 |
| | | | 719/328 |
| 2010/0121879 A1 | 5/2010 | Greenberg | |
| 2010/0313122 A1 | 12/2010 | Sanford | |
| 2011/0119652 A1 | 5/2011 | Yu et al. | |
| 2011/0173221 A1 | 7/2011 | Ahiakpor et al. | |
| 2011/0296375 A1 | 12/2011 | Mooney | |

(56) References Cited

U.S. PATENT DOCUMENTS

| | | | |
|---|---|---|---|
| 2011/0314078 A1* | 12/2011 | Morris | G06Q 10/10 709/202 |
| 2012/0089669 A1 | 4/2012 | Berg et al. | |
| 2012/0124494 A1* | 5/2012 | Grechanik | G06F 8/38 715/762 |
| 2012/0133662 A1* | 5/2012 | Morris | G06F 3/0484 345/581 |
| 2012/0144334 A1 | 6/2012 | Reichert | |
| 2012/0173760 A1 | 7/2012 | Jog et al. | |
| 2012/0179987 A1 | 7/2012 | Mohan et al. | |
| 2012/0185821 A1 | 7/2012 | Yaseen et al. | |
| 2012/0260154 A1* | 10/2012 | Delancy, Jr. | G06F 17/243 715/221 |
| 2012/0296999 A1 | 11/2012 | Kuo | |
| 2013/0007107 A1* | 1/2013 | Behl | H04L 29/00 709/203 |
| 2013/0007590 A1* | 1/2013 | Rivera | G06F 3/0481 715/234 |
| 2013/0031462 A1 | 1/2013 | Calvo et al. | |
| 2013/0041882 A1 | 2/2013 | Brodsky et al. | |
| 2013/0106885 A1* | 5/2013 | Clark | G06F 3/0481 345/581 |
| 2013/0111506 A1* | 5/2013 | Guddanti | G06F 17/30902 719/328 |
| 2013/0117351 A1* | 5/2013 | Zoheir | G06F 17/30905 709/203 |
| 2013/0132818 A1* | 5/2013 | Anders | G06T 13/00 715/234 |
| 2013/0166697 A1* | 6/2013 | Manning | H04L 69/18 709/219 |
| 2013/0173549 A1* | 7/2013 | Brunswig | G06F 8/30 707/639 |
| 2013/0290786 A1 | 10/2013 | Artzi et al. | |
| 2013/0326046 A1 | 12/2013 | Chan et al. | |
| 2013/0328888 A1 | 12/2013 | Beaver et al. | |
| 2013/0339835 A1* | 12/2013 | Marum | G06F 17/30554 715/222 |
| 2013/0346943 A1 | 12/2013 | Bharatia | |
| 2014/0089421 A1* | 3/2014 | Morris | G06F 9/541 709/206 |
| 2014/0101554 A1* | 4/2014 | Morris | H04L 67/36 715/733 |
| 2014/0173449 A1* | 6/2014 | Morris | H04L 67/32 715/738 |
| 2014/0195337 A1 | 7/2014 | Taylor et al. | |
| 2014/0195890 A1* | 7/2014 | Taylor | G06F 17/30 715/234 |
| 2014/0250422 A1* | 9/2014 | Bank | G06F 8/34 717/109 |
| 2014/0304690 A1 | 10/2014 | Wohlberg et al. | |
| 2014/0372205 A1* | 12/2014 | Ray | G06Q 30/0242 705/14.45 |
| 2015/0121448 A1* | 4/2015 | Burch | H04L 63/20 726/1 |
| 2015/0254222 A1 | 9/2015 | Shadfar | |
| 2016/0063872 A1 | 3/2016 | Trujillo et al. | |
| 2016/0077694 A1* | 3/2016 | Christoph | G06F 17/211 715/227 |
| 2016/0103815 A1* | 4/2016 | Suryadi | G06F 17/241 715/230 |
| 2016/0147828 A1* | 5/2016 | Yu | G06F 17/30654 705/31 |
| 2017/0060812 A1* | 3/2017 | Williams | G06F 17/212 |
| 2017/0269818 A1* | 9/2017 | Cen | G06F 3/04842 |

OTHER PUBLICATIONS

Project Orchard; Basic Orchard Concepts—Orchard Documentation; http://web.archive.org/web/20110817114710/http://orchardproject.net/docs/Default.aspx?Page=Basic_Orchard-Concepts&NS-&AspxAutoDetectCookieSupport=1; 10 pages; Jun. 23, 2011.

Walkthrough: Creating a Basic ASP.NET MVC Project; http://web.archive.org/web/20110905133448/http://msdn.microsoft.com/en-us/library/dd410123%28v=vs.98%29.aspx; 8 pages; Sep. 6, 2011.

Walkthrough: Using Templated Helpers to Display Data in ASP.NET MVC; http://webarchive.org/web/20110905075734/http://msdn.microsoft.com/en-us/library/ee308450%28v=VS.98%29aspx; 8 pages Sep. 5, 2011.

Lo, Weilun; Non-Final Office Action; U.S. Appl. No. 13/617,066, filed Sep. 14, 2012; United States Patent and trademark Office; Alexandria, VA.

Related U.S. Appl. No. 13/617,066; Entitled "User Interface With Configuration, Registration, and Runtime Selection of Views," filed Sep. 14, 2012 by Howard A. Abrams.

Related U.S. Appl. No. 14/672,734; Entitled "Providing a User Interface With Configurable Interface Components," filed Mar. 30, 2015 by Howard A. Abrams.

Office Action; U.S. Appl. No. 14/672,734; dated Jun. 2, 2017; United States Patent and Trademark Office; Alexandria, VA.

Final Office Action; U.S. Appl. No. 14/672,734; dated Sep. 22, 2017; U.S. Patent and Trademark Office, Alexandria, VA.

* cited by examiner

USER INTERFACE WITH RUNTIME SELECTION OF VIEWS

RELATED CASES

The present application is a divisional of, and claims benefit from, U.S. application Ser. No. 13/617,066, filed Sep. 14, 2012, entitled USER INTERFACE WITH CONFIGURATION, REGISTRATION, AND RUNTIME SELECTION OF VIEWS, the contents of which are incorporated herein by reference in their entirety.

BACKGROUND

The present disclosure relates to user interfaces, and more specifically, to configurable user interfaces.

Graphical user interfaces (GUIs) can be created using a variety of different techniques. However, ultimately the goal of the user interface is to define how a user will see data and be able to interact with that data. Although a developer can create source code in a programming language (e.g., Java, C#, etc.) to implement a GUI, toolkits of reusable widgets have been developed that simplify creation of GUIs. For example, a drag-and-drop development environment may be provided that allows a developer to select from a variety of pre-defined widgets and place them onto a pallet so as to create a basic GUI for a particular software application. The developer can then associate various portions of programming code with components of the widgets that will be invoked when a user eventually interacts with the elements of the GUI so as to perform the functionality of the software application.

The availability of widget toolkits and similar GUI design applications allows re-use of common widgets such as, for example, buttons, check boxes, forms, slider controls, drop-down menus, tree views, toolbars, text boxes, table views, query boxes, pop-up help windows, status bars, etc. without a developer recreating each widget from scratch each time it is needed. When the data to be viewed and interacted with is well known and defined, the widget toolkits and drag-and-drop development environments can simplify many aspects of defining a GUI. However, even with a toolkit of available widgets, development of a GUI to potentially handle multiple, disparate types of data, or even data that may not be known at development time, often requires a level of programming proficiency and effort that offsets some of the benefits provided by availability of the toolkits.

BRIEF SUMMARY

According to one aspect of the present disclosure, a method of providing a configurable user interface comprises receiving, by a server computer, a request for information to be rendered in a user interface; and in response to the request, sending, by the server computer, the information to be rendered and an identifier related to one of a plurality of user interface components. Also, in response to the request, the server computer sends a registry of the plurality of user interface components, wherein the registry comprises a respective entry for each of the plurality of user interface components. More particularly, the respective entry for a particular one of the plurality of user interface components comprises: a) a location of a configuration associated with the particular one user interface component; and b) a plurality of attributes and corresponding attribute values associated with the particular one user interface component.

According to another aspect of the disclosure, a system for providing a configurable user interface comprises a server computer comprising a communication module configured to receive a request for information to be rendered in a user interface; wherein the communication module further configured, in response to receiving the request, to send the information to be rendered and an identifier related to one of a plurality of user interface components. The communication module is further configured to send a registry of the plurality of user interface components, wherein the registry comprises a respective entry for each of the plurality of user interface components. More particularly, the respective entry for a particular one of the plurality of user interface components comprises: a) a location of a configuration associated with the particular one user interface component; and b) a plurality of attributes and corresponding attribute values associated with the particular one user interface component.

According to yet another aspect of the disclosure, a computer program product for providing a configurable user interface comprises a computer readable storage medium having computer readable program code embodied therewith. The computer readable program code, itself, comprises computer readable program code configured to receive a request for information to be rendered in a user interface; computer readable program code configured to send the information to be rendered and an identifier related to one of a plurality of user interface components; and computer readable program code configured to send a registry of the plurality of user interface components. The registry comprises a respective entry for each of the plurality of user interface components. More particularly, the respective entry for a particular one of the plurality of user interface components comprises: a) a location of a configuration associated with the particular one user interface component; and b) a plurality of attributes and corresponding attribute values associated with the particular one user interface component.

Another aspect of the present disclosure relates to a method of maintaining a registry of a plurality of user interface components that comprises determining a location of a configuration associated with a new one of the plurality of user interface components; assigning a respective value to each of a plurality of attributes associated with the new one of the plurality of user interface components, wherein at least a subset of the plurality of attributes relates to a runtime environment in which the new one of the plurality of user interface components can be instantiated; and adding a corresponding entry for the new one of the plurality of user interface components in the registry, wherein the entry comprises the location and plurality of respective values.

An additional aspect of the present disclosure relates to a system for maintaining a registry of a plurality of user interface components that comprises a computer-readable storage medium configured to store the registry; a component editing module configured to specify a location of a configuration associated with a new one of the plurality of user interface components; and wherein the component editing module is further configured to assign a respective value to each of a plurality of attributes associated with the new one of the plurality of user interface components, wherein at least a subset of the plurality of attributes relates to a runtime environment in which the new one of the plurality of user interface components can be instantiated. The component editing module, in communication with the computer-readable storage medium, is further configured to add a corresponding entry for the new one of the plurality of user interface components to the registry stored on the computer-readable storage medium, wherein the entry comprises the location and plurality of respective values.

Yet another aspect of the present disclosure relates to a computer program product for maintaining a registry of a plurality of user interface components that comprises a computer readable storage medium having computer readable program code embodied therewith. In particular, the computer readable program code comprises a) computer readable program code configured to determine a location of a configuration associated with a new one of the plurality of user interface components; b) computer readable program code configured to assign a respective value to each of a plurality of attributes associated with the new one of the plurality of user interface components, wherein at least a subset of the plurality of attributes relates to a runtime environment in which the new one of the plurality of user interface components can be instantiated; and c) computer readable program code configured to add a corresponding entry for the new one of the plurality of user interface components in the registry, wherein the entry comprises the location and plurality of respective values. An additional aspect of the present disclosure relates to a method for a runtime configurable user interface that comprises executing an application configured to render information within a user interface; analyzing a registry of a plurality of user interface components, wherein the registry comprises a respective entry for each of the plurality of user interface components; selecting a selected user interface component from among the plurality of user interface components; and rendering the information using the selected user interface component.

Another aspect of the present disclosure relates to a system providing a runtime configurable user interface. The system comprises a processor, memory and display configured to execute an application rendering information within a user interface. Also, the application is configured to analyze a registry of a plurality of user interface components, wherein the registry comprises a respective entry for each of the plurality of user interface components; and is further configured to select a selected user interface component from among the plurality of user interface components and to render the information using the selected user interface component.

One additional aspect of the present disclosure relates to a computer program product for providing a runtime configurable user interface that comprises a computer readable storage medium having computer readable program code embodied therewith. In particular, the computer readable program code comprises computer readable program code configured to execute an application configured to render information within a user interface; computer readable program code configured to analyze a registry of a plurality of user interface components, wherein the registry comprises a respective entry for each of the plurality of user interface components; computer readable program code configured to select a selected user interface component from among the plurality of user interface components; and computer readable program code configured to render the information using the selected user interface component

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
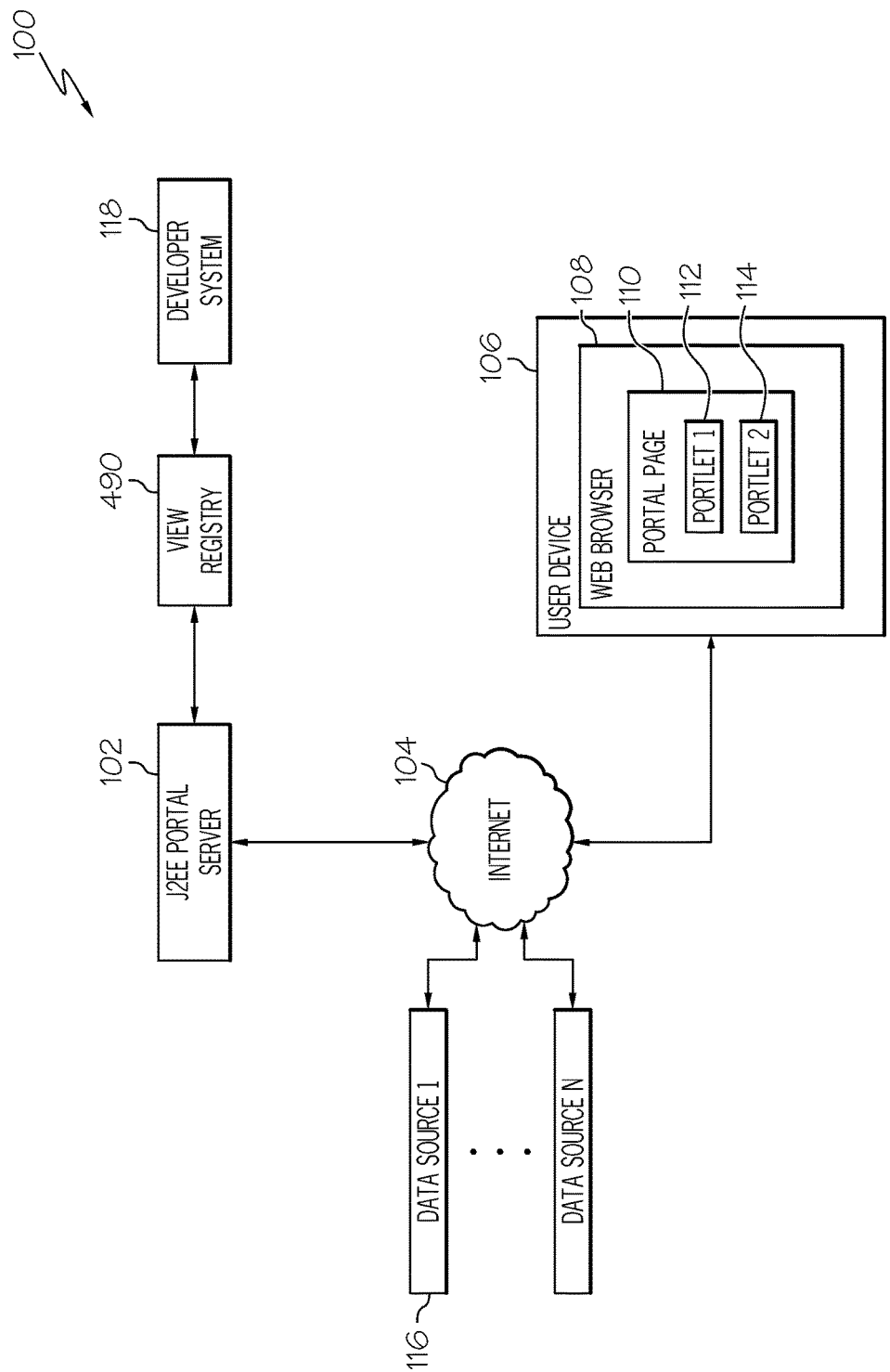
FIG. 1 illustrates an example computing environment in which a view registry can be deployed in accordance with the principles of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

To aid in understanding aspects of the present disclosure, an example environment of Java-implemented portals and portlets is described, with respect to FIG. 1. However, one of ordinary skill will readily recognize that this environment is provided merely by way of example and the functionality and behavior described herein is not limited to this environment. The example environment is one particular example of a software application that provides a user interface to a user so that the user can view data and interact with that data.

Referring to FIG. 1, a server 102 can operate so as to provide a single web application or a plurality of web applications. In particular, the server 102 can provide a portal page that can include a number of different portlets. For example, a user can communicate with the server 102 using a user device 106 and a network 104, e.g., the Internet. The user device 106 can be a mobile device, a desktop computer, a laptop, or similar device that includes a user interface such as, for example, a browser 108. The browser 108 renders a portal page 110 that is received from the portal server 102. In particular, the portal page 110 can typically include a plurality of windows or portlets 112, 114 that compartmentalize different data. For example, portlet 1 112 may comprise weather-related information and portlet 2 114 may comprise a news feed. The portal server 102 consolidates this information from different data sources 116 and provides them as respective portlets 112, 114 within the portal page 110. When a user interacts with a portlet (e.g., makes a selection, clicks on a hyperlink, etc.), this interaction can be communicated back to the portal server 102 so that the content of the portal page 110 may be updated.

As mentioned above, the environment of FIG. 1 is merely an example environment of a more general case in which an application (e.g., portal server 102) provides a user interface (e.g., portal page 110) that has a component, or a plurality of components, (e.g., portlets 112, 114) with which a user interacts. The environment of FIG. 1 happens to be distributed over a network; however, the application and its user interface may both be implemented on a single machine as well.

While any of a variety of widgets can be used to construct a user interface, different "views" are a basic component of almost all user interfaces. For example, a table view is view in which a plurality of objects of a similar type are depicted in a list, often with multiple columns such as a table view 202 FIG. 2. Another view, a form view, may provide a detailed listing of every attribute of a particular object. Thus, a user interface can be developed which, in part, includes a composite view 200 that has a left panel with a table view 202 and a right panel with a form view 204.

An application developer may want to develop an application that includes the composite view 200. Thus, the composite view 200 can include the table view 202 which includes a table of entries 206 having a plurality of rows wherein each row is associated with a particular object (e.g., a computer system). The table view 202 is constructed so that a user can select a row (e.g., by selecting a hyperlink in one of the cells of the table 206). Based on a user's selection, the form view 204 will display detailed information about the computer system associated with the user's selected row.

Figure 2:
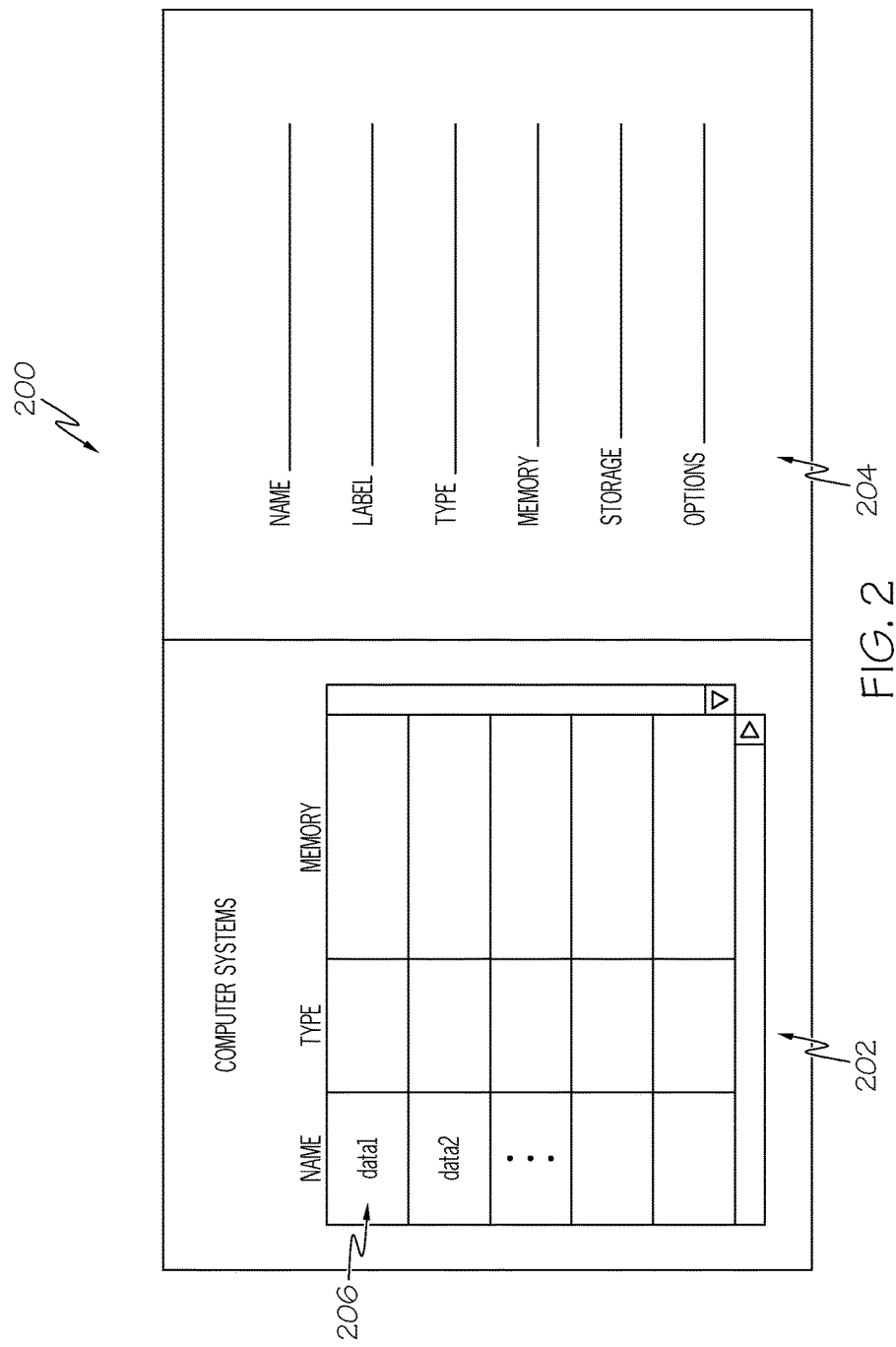
FIG. 2 illustrates a screen shot of a user interface comprising a composite view in accordance with the principles of the present disclosure.

The composite view 200 of FIG. 2 may be beneficial for a user interface that is implemented on a desktop computer or a device having a relatively large display screen. However, the application developer may want to utilize a different user interface for the table 202 and form 204 when a user's device is a mobile device or has a relatively small display screen. Thus, even though the information provided by a user interface can be the same in both instances, the application developer may want one user interface configuration for users using a desktop computer and a different user interface configuration for users using a mobile device.

In accordance with the principles and techniques described in this disclosure, a view registry 490 is implemented that identifies different views created by application developers and, for each such view, identifies attributes which help identify when that particular view may be better to use than other views in the view registry. In parts of the previous discussion and in the examples described below, the term "view" is used as one example of a user interface component. Thus, even though the term "view" may be used, other components of a user interface that are rendered for a user either to display data or to allow interaction with data are contemplated within the scope of the term "view".

Figure 3:
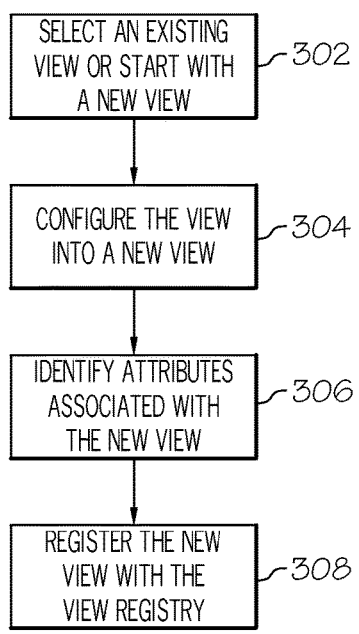
FIG. 3 depicts a flowchart of an exemplary method for creating a registry table in accordance with the principles of the present disclosure.

FIG. 3 depicts a flowchart of an exemplary method for creating a registry table in accordance with the principles of the present disclosure. An application developer may use a developer system 118 which is a computer platform that allows the application developer to create new views, locate existing views, modify existing views, and register new views with a view registry 490. A view registry 490 may be available through a web service or stored on local storage device. Using the view registry 490, an application developer can search for existing views that are similar to what they desire for their current application or to identify views that can be combined to form a composite view that they desire to construct. Also, widget toolkits and other user interface design tools may be available on the developer system 118 that provide basic building blocks that can be combined to define the configuration code of a composite view by an application developer who is designing a user interface portion for their application.

In step 302, of FIG. 3, an application developer who is designing a user interface either selects an existing view or begins with a new view. For example, a view "Example" may be a shell of a view that contains a table view and a form view. The table view is a known design element that is provided with a list of objects of the same type and displays them in a table such as the table 202 of FIG. 2. A form view is a known design element that is provided with an identifier for an object and displays a list of the attributes for that object such as the form view 204 of FIG. 2.

Using the basic view "Example", the application developer modifies, or configures, the view, in step 304, to create a new version of "Example". As an example, the application developer can configure the table view and the form view in a side-by-side configuration as shown in FIG. 2. When a user selects an item in row 206 of the table 202, the form 204 is populated with details about that selected item. This new configuration can be registered in the view registry as "Example_desktop". One of ordinary skill will recognize that any appropriate naming convention may be used, but the name "Example_desktop" is useful in that it identifies that the basic view is "Example" and that this particular configuration is intended for "desktop" users.

The same application developer or another application developer, in step 304, can configure the "Example" view such that a table view is shown in a full screen by itself. When a user selects an item in the table, then the screen is replaced by a form view shown in the full screen. The form view includes a "BACK" button or some other design element to return to the table view. This configuration, or version, of the "Example" view can be registered in the view registry as "Example_mobile".

Some languages read from right to left instead of left to right. Thus, an application developer may want to create yet another configuration of the Example view that places the table view on the right half of a window and the form view on the left half of the window. This configuration may be registered in the view registry as "Example_RtoL".

The form view and table view can themselves be used to create different configurations to be registered with the view registry. Thus, the form view 204 can be a generic form view that can display any type of object having attributes. According to the form view, the attributes are displayed in a default order in a simple list. An application developer may, however, desire a custom form view when the object being displayed is of a particular type (e.g., objects of type A). The application developer can modify the generic form view such that the attribute fields for objects of type A appear in a particular order and in a particular arrangement (e.g., 3 columns of 3 elements each). The application developer could then register that form view as "form_ObjectA" in the view registry.

As part of configuring the new view that is to be registered, the application developer, in step 306, determines attributes associated with that new view that help identify user devices or user platforms that particularly benefit from the new view configuration. An example of some attributes that may be beneficial are provided in the table below:

| View Attribute | Usage |
| --- | --- |
| viewName | the exact name of the view<br>e.g., com.dom.panther.Example_mobile |
| alias | a set of related views can be associated with one another by assigning all such views the same alias name<br>e.g., Example |
| create | a Boolean value that indicates whether a view supports create operations |
| dataClass | identifies the class, if any, that the view belongs to<br>e.g., list, form, table, etc. |
| desktop | a Boolean value that specifies whether a view supports desktop interaction |
| locale | an identification of language and country the view is intended for<br>e.g., English - United States |
| size | identifies a supported display size<br>e.g., 800×600 |
| read | a Boolean value that indicates whether a view supports read operations |
| objectType | identifies specific object types supported by the view |
| touch | a Boolean value that indicates whether the view supports touch interaction |
| update | a Boolean value that indicates whether a view supports update operations |

Thus, in step 306, the application developer identifies one or more attributes that help differentiate one view configuration from another. Values are assigned to the identified attributes and the new view configuration is registered in step 308 into the view registry.

Figure 4:
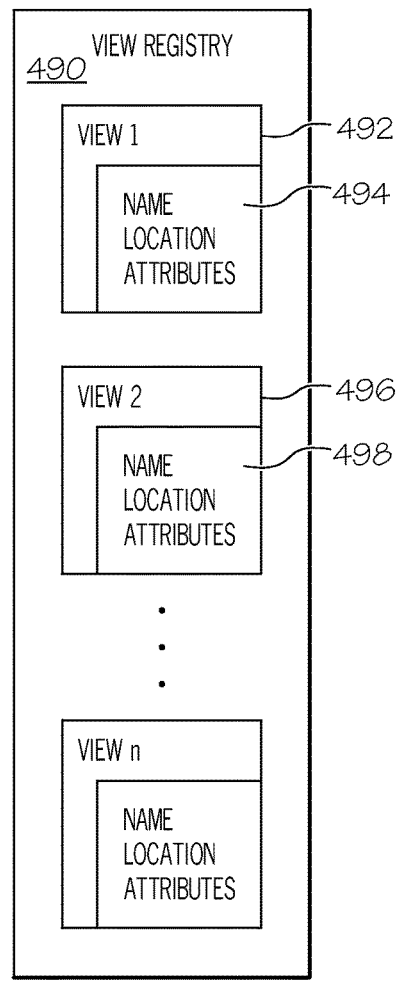
FIG. 4 depicts a conceptual example of a view registry in accordance with the principles of the present disclosure.

FIG. 4 depicts a conceptual example of a view registry in accordance with the principles of the present disclosure. The view registry 490 includes a respective entry 492, 496 for a plurality of different views. Each entry of a view (e.g., 492, 496) includes respective information 494, 498 about that view. The information for a view entry can include the name of that view (e.g., Example_mobile) and a location for the configuration of that view (e.g., com.dom.panther.example_mobile.js). This configuration is what the application developer created using a GUI development tool and is used to instantiate this view when it is encountered by a user executing the application. One of ordinary skill will recognize that the view configuration may be created using any of a variety of different tools and techniques available to an application developer for creating a view configuration. In the above examples, a view configuration "Example_desktop.js" could have been created that comprised a composite view 200 having a table view 202 on the left half of a screen, a form view 204 on the right half of the screen, and declarative code that tied the display of an object in the form view with a selection of a row in the table view.

A register entry (e.g., 492, 496) for a view may also include values for a plurality of attributes that help distinguish one view from another. Example attributes are identified in the table above but one of ordinary skill will recognize that other attributes may be added to that example list and all the listed attributes may not necessarily be used. As explained below, these attributes may be used at runtime to provide a user interface that is customized for the user's device or platform. Some of these attributes may also relate to the data (e.g., the object type) to be displayed. Thus, the user interface may be customized based on the runtime data being displayed.

Figure 5:
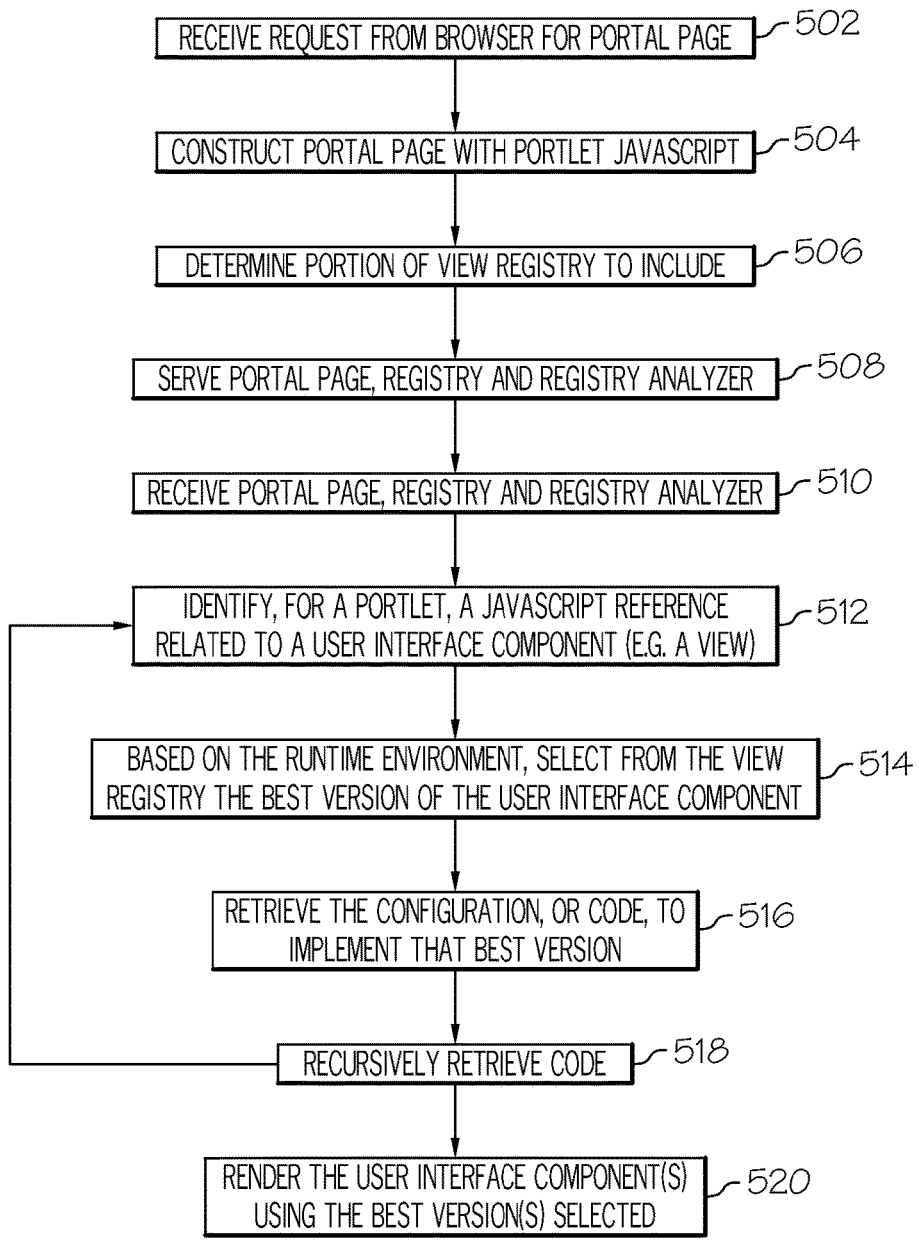
FIG. 5 depicts a flowchart of an exemplary method for determining a user interface at runtime.

FIG. 5 depicts a flowchart of an exemplary method for determining a user interface at runtime. The flowchart of FIG. 5 returns again to the example environment of FIG. 2 in which a portal server 102 is used to serve portlets 112, 114 to a browser 108. The steps in the flowchart of FIG. 5 may, however, be performed in any of a variety of different environments, other than just portlets, in which an application is executing that provides user interface elements to a user to allow that user to view data and interact with data.

Initially, in step 502, a request from a browser is received by a server requesting a portal page. The request from the browser can include information about the browser (e.g., an Operating System on which the browser is running, a processor of a user device which is running the browser, a character set used by the browser, a language and locale of the environment in which the browser is running, etc.). In response to the request for a portal page, the server constructs a portal page to send to the browser, in step 504. Each portlet included in the portal page will be comprised of its own portion of javascript that the browser will use to render the portlet in a window viewable by the user.

In step 506, the server may optionally determine which parts of the view registry 490 is relevant to the requested portal page. For example, if the request of step 502 indicates that a requesting device is a mobile device, then views in the view registry 490 related to requiring desktop interaction may not be relevant to the requested portal page and may not be sent. An example of portions of a view registry, for two registered views, that can be provided by a server is shown below:

```
{ "ViewName" : "Example_mobile", "Alias" : "Example",
"ViewClass" : "custom", "DataClass" : "custom",
"Locale" : "{'*_*':1}", "Desktop" : false, "Touch" :
true, "Config" : "example_mobile.js" }
{ "ViewName" : "Example_desktop", "Alias" : "Example",
"ViewClass" : "custom", "DataClass" : "custom", "Locale" :
"{'*_*':1}", "Desktop" : true, "Touch" : false, "Config" :
"example_desktop.js" }
```

In the above example, the first field provides a name for the view and the next fields provide a list of attributes and an associated value for the view. The last item in each view entry is a location where the actual configuration script, or code, for instantiating that view may be located so that it can be retrieved as needed.

In step 508, the server serves to the browser the portal page and the view registry, or at least a relevant portion of the view registry. The server may also include with the portal page a script, or similar executable statements, that can analyze the view registry, as explained below. Alternatively, the portal page may include javascript that, when executed, separately requests the view registry. In step 510, the browser receives the portal page, the view registry, and the javascript, for example, which can analyze the view registry.

In a portlet implemented using javascript, for example, the javascript may include a line referencing a function ViewRegistry that is executed, in step 512, to determine which view in the view registry is to be used to render the current portlet. The ViewRegistry function is included, as mentioned above, by the server as part of the portal page and is capable of analyzing the view registry. The syntax or format of the ViewRegistry function can vary greatly but, in concept, it specifies one or more criteria for the view that is to be used to render the portlet. For example, the ViewRegistry function can specify a value for alias, dataClass, etc. and identify those views in the view registry that best match the specified values considering attributes of the runtime environment.

In general, the executable line provided for a portlet can include an identifier that is related to one of the attributes of the views in the view registry. For example, the executable line provided for this portlet by the server for the ViewRegistry function can specify that alias="Example". The functionality of the ViewRegistry function can then search the view registry locating all the entries having a matching value (e.g., Example) for the attribute alias. The ViewRegistry function can also evaluate the other attributes such as desktop, touch, locale, etc. as compared to those same attributes of the system on which the portlet is to be rendered. Of the entries in the view registry, the function ViewRegistry identifies, in step 514, the view entry that provides a "best" match to the current user environment. The call of the ViewRegistry function can also specify alternative criteria such as, for example, ViewName="Example_mobile" or DataClass="list". In the former example, this will result in identifying a particular view by name so that its configuration file is used for instantiating the view when rendering the portlet; and the latter example, will avoid looking a tables and forms when identifying a best view from the view registry.

One of ordinary skill will recognize that there are a variety of ways to identify a "best match". For example, in the above example of the portion of the view registry, there is an attribute "Locale: {*_*:1}". This example syntax may be interpreted that any language and location (e.g., the wildcard *_*) will match this view entry but that it will be given a weight, or value, of "1". An alternative view entry in the registry might have the same exact syntax for all the other attributes except for "Locale: {EN_US:5}". In this instance, if the user local is identified as the English language in the United States, then this match has a weight, or value, of "5". Thus, the ViewRegistry function can determine a best matching view by assigning a "1" to each attribute that matches and a "0" to all not matching attributes. A sum can be tallied for each view entry in the view registry and used to rank the view entries to determine the "best match". Also, assigning weighted values to one or more attributes may be used when generating a score.

Once the ViewRegistry function has identified the best matching view from the view registry, the location of the configuration information is retrieved from the registry entry, in step 516. The location may point to code that has already been loaded as part of the current portal page, code that may be present in a browser cache because it was referenced earlier, or code that is resident on the portal server or other system. If the view is a re-configuration of a previous view, configuration information that re-configures previous view into a new view is loaded. If the view is a wholly new view, then the code that implements that view can be loaded. The retrieved view configuration code can itself include references to ViewRegistry to be resolved for selecting additional views from the view registry. In other words, the configuration for a view may include sub-views and these sub-views may be loaded and parsed for any sub-views that they may contain. Thus, in step 518, the executable code that was provided by the server for analyzing the view registry recursively parses through the JavaScript, for example, for rendering a portlet to select the various, potentially nested views and sub-views to use to render the portlet. Thus, the loop between steps 512 and 518 in FIG. 5 may be repeated until all the code for rendering the portlet has been determined. Once all the code for rendering a portlet in a user interface has been identified and retrieved, views using retrieved code can be instantiated to render the portlet.

Because a view entry in the view registry can point to a location on the portal server, or other system, where the configuration code for implementing that view resides, the views which are used to provide the user interface can be easily updated and used even while a user is accessing the portal page. Also, new views can be added to a view registry to take advantage of new devices or different capabilities as they are developed without requiring any change to the portal server.

Figure 6:
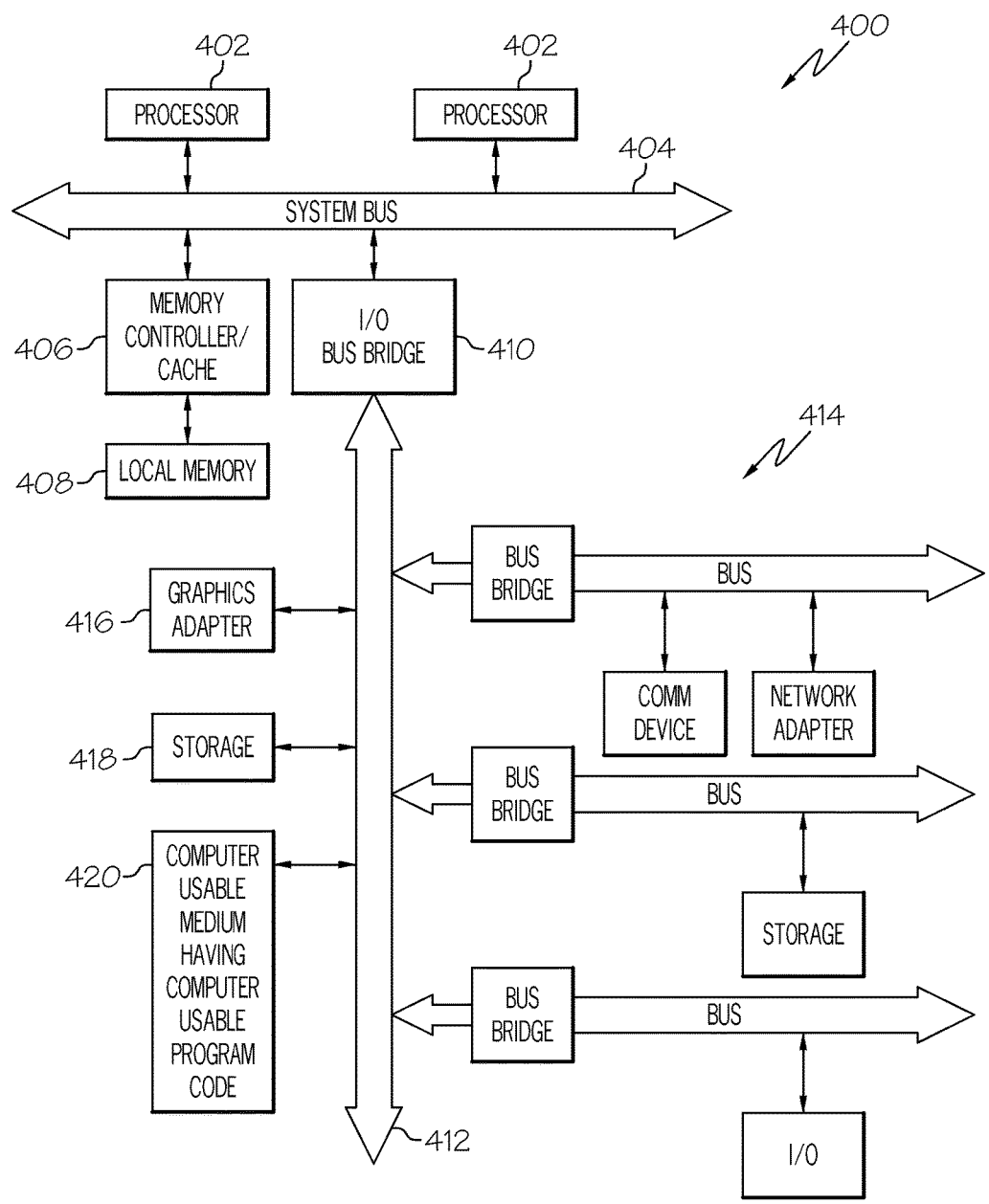
FIG. 6 is a block diagram of a data processing system in accordance with the principles of the present disclosure.

Referring to FIG. 6, a block diagram of a data processing system is depicted in accordance with the present disclosure. A data processing system 400, such as may be utilized to implement the hardware platform 108 or aspects thereof, e.g., as set out in greater detail in FIG. 1-FIG. 5, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 5.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method for a runtime configurable user interface comprising:
   executing, on a computer system, an application configured to render information within a user interface;
   receiving, by the application from a server separate from the computer system, a registry of a plurality of user interface components, wherein the registry comprises respective entries for the plurality of user interface components and the respective entry for each of at least a subset of the plurality of user interface components comprises:
      a plurality of attributes and corresponding attribute values associated with respective ones of the subset of user interface components; and
      one or more weighted values corresponding to the plurality of attributes;
   receiving, by the application from the server, code executable by the computer system to perform operations comprising:
      using the corresponding attribute values and the one or more weighted values to rank the plurality of user interface components, wherein the rankings are based on a best match IQ a runtime environment of the computer system; and
      selecting a particular user interface component from among the plurality of user interface components based on the rankings; and
   rendering, on a display of the computer system, by the application, the information using the selected user interface component.

2. The method of claim 1, wherein the respective entry for a particular one of the plurality of user interface components comprises a location of a configuration associated with the particular one user interface component.

3. The method of claim 1, wherein selecting a user interface component further comprises:
    identifying a subset of the plurality of user interface components, wherein each user interface component within the subset has one corresponding attribute value matching a particular identifier; and
    calculating a respective score for each particular one of the user interface components of the subset based on the one or more weighted values corresponding to the attribute value matching the particular identifier.

4. The method of claim 3, wherein calculating further comprises:
    determining a respective runtime attribute value related to each of the corresponding attribute values of the subset of the plurality of user interface components;
    determining if each runtime attribute value matches its related corresponding attribute value; and
    adjusting the calculated respective score based on whether each runtime attribute value is determined to match its related corresponding attribute value.

5. A system providing a runtime configurable user interface comprising:
    a processor, memory, and display, the memory storing instructions executable by the processor, wherein the processor when executing the instructions:
        executes an application rendering information within a user interface;
        receives a registry of a plurality of user interface components from a server separate from the system, wherein the registry comprises respective entries for the plurality of user interface components, and the respective entry for each of at least a subset of the plurality of user interface components comprises:
            a plurality of attributes and corresponding attribute values associated with respective ones of the subset of user interface components; and
            one or more weighted values corresponding to the plurality of attributes;
        receives, from the server, code executable by the processor to cause the processor to perform operations comprising:
            using the corresponding attribute values and the one or more weighted values to rank the plurality of user interface components, wherein the rankings are based on a best match to a runtime environment executed by the processor; and
            selecting a particular user interface component from among the plurality of user interface components based on the rankings; and
        renders the information within the user interface using the selected user interface component.

6. The system of claim 5, wherein the respective entry for a particular one of the plurality of user interface components comprises a location of a configuration associated with the particular one user interface component.

7. The system of claim 5, wherein the processor when executing the instructions:
    identifies a subset of the plurality of user interface components, wherein each user interface component within the subset has one corresponding attribute value matching a particular identifier; and
    calculates a respective score for each particular one of the user interface components of the subset based on the one or more weighted values corresponding to the attribute value matching the particular identifier.

8. The system of claim 7, wherein the processor when executing the instructions:
    determines a respective runtime attribute value related to each of the corresponding attribute values of the subset of the plurality of user interface components;
    determines if each runtime attribute value matches its related corresponding attribute value; and
    adjusts the calculated respective score based on whether each runtime attribute value is determined to match its related corresponding attribute value.

9. A non-transitory computer-readable storage medium having instructions stored thereon that are executable by a computing device to perform operations comprising:
    executing an application configured to render information within a user interface of the computing device;
    receiving a registry of a plurality of user interface components from a server separate from the computing device, wherein the registry comprises respective entries for the plurality of user interface components, and the respective entry for each of at least a subset of the plurality of user interface components comprises:
        a plurality of attributes and corresponding attribute values associated with respective ones of the subset of user interface components; and
        one or more weighted values corresponding to the plurality of attributes;
    receiving, from the server, code executable by the computing device to cause the computing device to perform operations comprising:
        using the corresponding attribute values and the one or more weighted values to rank the plurality of user interface components, wherein the rankings are based on a best match IQ a runtime environment of the computing device; and
        selecting a particular user interface component from among the plurality of user interface components based on the rankings; and
    rendering the information within the user interface using the selected user interface component.

10. The non-transitory computer-readable storage medium of claim 9, wherein the respective entry for a particular one of the plurality of user interface components comprises a location of a configuration associated with the particular one user interface component.

11. The non-transitory computer-readable storage medium of claim 9, having instructions stored thereon that are executable by the computing device to perform operations comprising:
    identifying a subset of the plurality of user interface components, wherein each user interface component within the subset has one corresponding attribute value matching a particular identifier; and
    calculating a respective score for each particular one of the user interface components of the subset based on the one or more weighted values corresponding to the attribute value matching the particular identifier.

12. The non-transitory computer-readable storage medium of claim 11, having instructions stored thereon that are executable by the computing device to perform operations comprising:
    determining a respective runtime attribute value related to each of the corresponding attribute values of the subset of the plurality of user interface components;
    determining if each runtime attribute value matches its related corresponding attribute value; and adjusting the calculated respective score based on whether each runtime attribute value is determined to match its related corresponding attribute value.

* * * * *